(12) United States Patent
Tsadok

(10) Patent No.: US 10,686,606 B2
(45) Date of Patent: Jun. 16, 2020

(54) HEADER ENHANCEMENT

(71) Applicant: Facebook, Inc., Menlo Park, CA (US)

(72) Inventor: Israel Tsadok, Hoshaya (IL)

(73) Assignee: Facebook, Inc., Menlo Park, CA (US)

( * ) Notice: Subject to any disclaimer, the term of this patent is extended or adjusted under 35 U.S.C. 154(b) by 130 days.

(21) Appl. No.: 15/432,498

(22) Filed: Feb. 14, 2017

(65) Prior Publication Data

US 2018/0234508 A1    Aug. 16, 2018

(51) Int. Cl.
| | |
|---|---|
| *H04L 9/32* | (2006.01) |
| *H04L 29/08* | (2006.01) |
| *H04L 29/06* | (2006.01) |
| *H04L 12/58* | (2006.01) |
| *G06Q 50/00* | (2012.01) |
| *G06Q 30/02* | (2012.01) |
| *G06Q 10/10* | (2012.01) |
| *G06Q 30/06* | (2012.01) |

(52) U.S. Cl.
CPC .......... *H04L 9/3247* (2013.01); *G06Q 10/10* (2013.01); *G06Q 30/0207* (2013.01); *G06Q 30/0241* (2013.01); *G06Q 30/0271* (2013.01); *G06Q 30/06* (2013.01); *G06Q 50/01* (2013.01); *H04L 51/32* (2013.01); *H04L 63/0428* (2013.01); *H04L 67/02* (2013.01); *H04L 67/2814* (2013.01); *H04L 67/2804* (2013.01); *H04L 69/22* (2013.01); *H04L 2209/60* (2013.01)

(58) Field of Classification Search
None
See application file for complete search history.

(56) References Cited

U.S. PATENT DOCUMENTS

| | | | |
|---|---|---|---|
| 8,713,690 B2 * | 4/2014 | Harada | G06Q 20/206 705/26.2 |
| 2013/0339724 A1 * | 12/2013 | Amit | H04L 63/0272 713/151 |
| 2015/0019622 A1 * | 1/2015 | Chan | H04L 67/2814 709/203 |
| 2016/0234209 A1 * | 8/2016 | Kahol | H04L 63/0869 |

* cited by examiner

*Primary Examiner* — Peter Chen
*Assistant Examiner* — Jeff Bathrongsack
(74) *Attorney, Agent, or Firm* — Baker Botts L.L.P.

(57) ABSTRACT

In one embodiment, a method includes receiving a first encrypted request from a client device. The request includes a request for access to a resource corresponding to a first uniform resource locator (URL). The method also includes routing the first encrypted request to the first URL; and sending a first response to the client device from the first URL. The first response includes a redirection instruction to a second URL, and the second URL is an unsecured URL. The method also includes intercepting an unencrypted request from the client device. The unencrypted request includes a request to access a resource corresponding to the second URL. The method also includes sending a modified version of the unencrypted request to the resource corresponding to the second URL. The modified version of the unencrypted request includes information identifying the client device.

20 Claims, 5 Drawing Sheets

HEADER ENHANCEMENT

TECHNICAL FIELD

This disclosure generally relates to Internet transactions.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a server providing access to a resource may want information associated with a user prior to providing access to the resource. For example, a server of a social-networking system may determine whether the user currently has an active session or has signed a terms-of-service (TOS) prior to providing access to a newsfeed. In particular embodiments, a gateway (e.g., associated with a mobile network operator) may receive an encrypted request from a client device to access a particular resource corresponding to a particular uniform resource locator (URL). In the hyptertext transport protocol (HTTP), a request may include a request line (e.g., denoted by a GET command) followed by a header section. The header section may include one or more header fields (e.g., referer or user-agent) that provide information associated with the request. Header fields may be standard or non-standard, and in particular embodiments, headers may be dynamically generated.

The gateway may route the encrypted request to the particular URL, and send a response to the client device from the particular URL. In particular embodiments, the response includes a redirection instruction to a secondary URL (e.g., an unsecured URL). In particular embodiments, the gateway may intercept an unencrypted request from the client device that includes a request to access a resource corresponding to the secondary URL that is sent in response to the redirection instruction. For example, a process running (e.g., web proxy) on the gateway may be configured to intercept and parse the unencrypted request. The process may analyze the parsed header of the unencrypted request.

In addition, the process may add information to the header of the unencrypted request (e.g., through a non-standard header field) and the gateway may send a modified version of the unencrypted request to the secondary URL. The header of the modified, unencrypted request sent by the gateway may include information identifying the client device of the user. For example, the modified version of the unencrypted request may include information that identifies the client device or the user, such as for example a media access control (MAC) address, phone number, token, or user ID. The gateway may route a response to the modified version of the unencrypted request from the secondary URL to the client device. In particular embodiments, the response sent to the client device may include a redirection instruction to the particular URL (referenced in the initial encrypted request). The gateway may route a second encrypted request sent by the client device to the particular URL in response to the client device receiving the response sent by the secondary URL.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a server providing access to a resource may want information associated with a user prior to providing access to the resource. For example, a server of a social-networking system may determine whether the user currently has an active session or has signed a terms-of-service (TOS) prior to providing access to a newsfeed. In particular embodiments, a gateway (e.g., associated with a mobile network operator) may receive an encrypted request from a client device to access a particular resource corresponding to a particular uniform resource locator (URL). The gateway may route the encrypted request to the particular URL, and send a response to the client device from the particular URL. In the hyptertext transport protocol (HTTP), a request may include a request line (e.g., denoted by a GET command) followed by a header section. The header section may include one or more header fields (e.g., referer or user-agent) that provide information associated with the request. Header fields may be standard or non-standard, and in particular embodiments, headers may be dynamically generated.

In particular embodiments, the response includes a redirection instruction to a secondary URL (e.g., an unsecured URL). In particular embodiments, the gateway may intercept an unencrypted request from the client device that includes a request to access a resource corresponding to the secondary URL that is sent in response to the redirection instruction. For example, a process running (e.g., web proxy) on the gateway may be configured to intercept and parse the unencrypted request. The process may analyze the parsed header of the unencrypted request.

In addition, the process may add information to the header of the unencrypted request (e.g., through a non-standard header field) and the gateway may send a modified version of the unencrypted request to the secondary URL. The header of the modified, unencrypted request sent by the gateway may include information identifying the client device of the user. For example, the modified version of the unencrypted request may include information that identifies the client device or the user, such as for example a media access control (MAC) address, phone number, token, or user ID. The gateway may route a response to the modified version of the unencrypted request from the secondary URL to the client device. In particular embodiments, the response sent to the client device may include a redirection instruction to the particular URL (referenced in the initial encrypted request). The gateway may route a second encrypted request sent by the client device to the particular URL in response to the client device receiving the response sent by the secondary URL.

Figure 1:
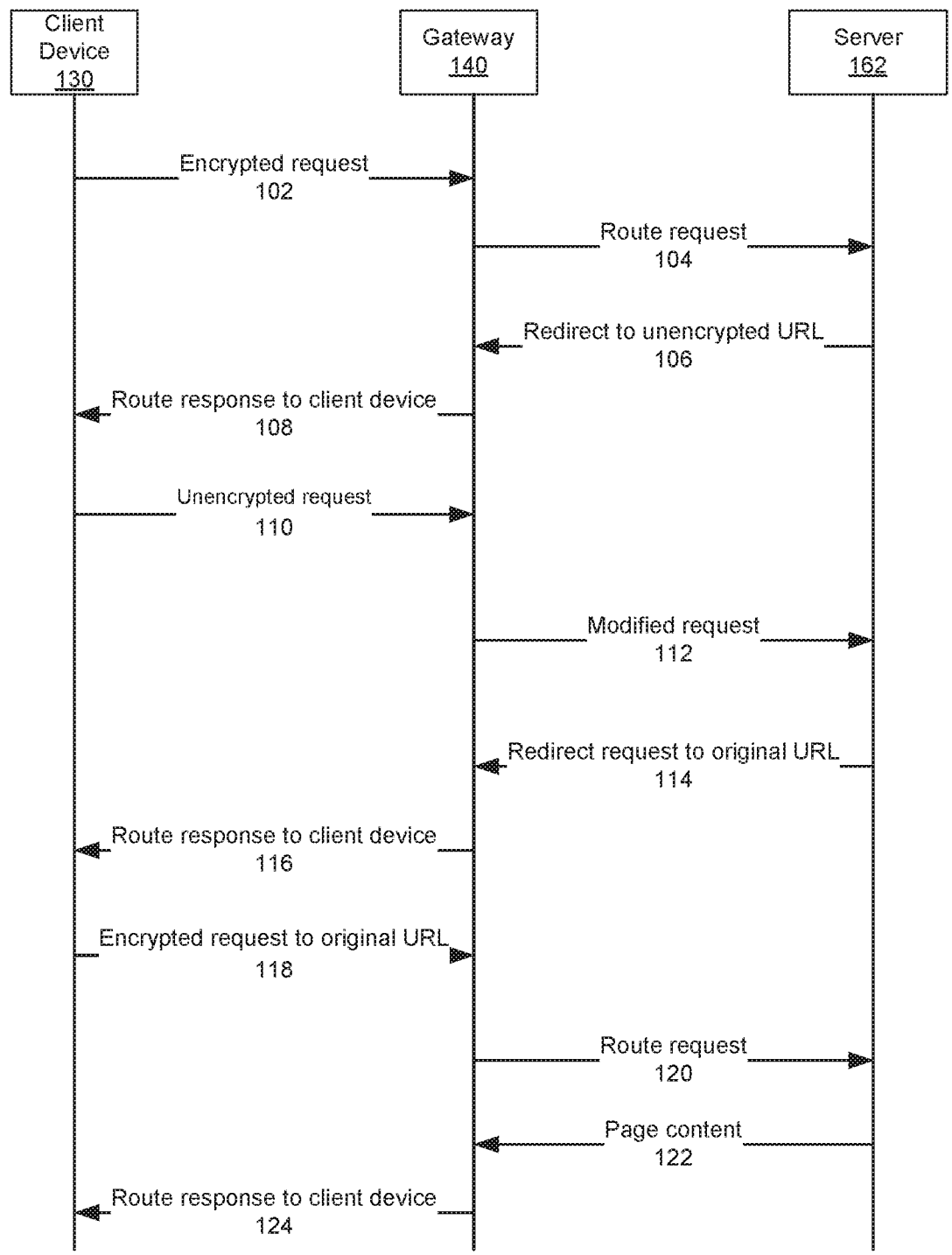
FIG. 1 illustrates an example interaction diagram between server and client device.

Particular embodiments describe a method for allowing a user access to a particular resource without providing access to the rest of a computing system. In addition, the method may enable the computing system to determine the identity of a client device or a state associated with the user, including whether the user has an active session, has signed the TOS, or is logged on to the computing system. FIG. 1 illustrates an example interaction diagram between a server and a client system through a gateway (e.g., mobile network operator). Although FIG. 1 illustrates the interactions between a particular server 162 and client system 130, this disclosure contemplates the interaction between any suitable server of any suitable system and client system 130. In particular embodiments, gateway 140 may be associated with a social-networking system. As an example and not by way of limitation, the social-networking system may administer gateway 140 for another entity.

As illustrated by 102, gateway 140 may receive an encrypted request from a web browser 132 of client device 130 to access a resource (e.g., a webpage) corresponding to a particular URL. As an example and not by way of limitation, the encrypted request may conform to the hypertext transfer protocol over SSL (HTTPS) protocol, depending on the URL protocol associated with the resource. At 104, gateway 140 routes the request to a server 162 (e.g., authentication server) corresponding to the particular URL.

In particular embodiments, server 162 may require information identifying client device 130 or the user be collected prior to providing access. As illustrated by 106, server 162 may send a response to the client device 130 through gateway 140. As an example and not by way of limitation, the response may include a redirection instruction (e.g., through a hypertext transfer protocol (HTTP) 302 redirect instruction) that references a second URL. The HTTP 302 redirect instruction temporarily redirects a request to another URL. At 108, gateway 140 routes the response to web browser 132 of client device 130. In particular embodiments, the second URL may be an unsecured URL associated with a social-networking system.

Gateway 140 receives an unencrypted request that includes the unsecured URL specified in the redirection instruction from server 162, as illustrated by 110. In particular embodiments, a process executed (e.g., web proxy) on gateway 140 is configured to intercept the unencrypted request referencing the unsecured URL sent by client device 130. The process may parse the unencrypted request, and analyze the headers or the content of the unencrypted request. The process may then generate a modified version of the unencrypted request. Gateway 140 has access to identifying information of client device 130 (e.g., media access control (MAC) address, phone number, token, or user ID) and in particular embodiments, the header of the modified version of the unencrypted request may include information identifying client device 130 or the user. As an example and not by way of limitation, the process may dynamically create a non-standard header field corresponding to identifying information of client device 130 and populate the newly created header field with the MAC address of client device 130. The process executed by gateway 140 may digitally sign the identifying information contained in the header (for security), and gateway 140 sends the modified version of the unencrypted request to the unsecured URL that was specified in the unencrypted request from client device 130, as illustrated by 112.

In particular embodiments, server 162 parses the header of the modified, unencrypted request generated and sent by gateway 140 and stores the user identifying information. In particular embodiments, the user status (e.g., current active session or signed TOS) may be determined by matching the MAC address of client device 130 that was added to the header of the modified version of the unencrypted request, to a previously stored MAC address. As an example and not by way of limitation, the MAC address added to the modified version of the unencrypted request may be analyzed to determine whether the client device and in turn the user is authorized to access the resource, such as a particular group or newsfeed, that corresponds to the particular URL. In particular embodiments, server 162 attempts to match the MAC address in the header of the modified version of the unencrypted request to MAC addresses previously stored on a long-lived cookie of web browser 132. In particular embodiments, the particular URL may be preserved in the referer field of the HTTP headers. Session information regarding the originally requested URL may be saved with the user identifying information.

In particular embodiments, gateway 140 may receive a response for client device 130 from server 162 that includes a second redirection instruction (e.g., through a HTTP 302 redirect instruction), as illustrated by 114. The second redirect instruction may direct web browser 132 to access the particular URL (from 102) specified in the original encrypted request. At 116, gateway 140 routes the response that includes the second redirection instruction to client device 130. At 118, gateway 140 may receive a second encrypted request to access the particular URL specified in the original encrypted response (illustrated in 102) from web browser 132 of client device 130. The second encrypted request to access the particular URL is sent in accordance to the response (from 114) from server 162. As illustrated by 120, gateway 140 routes the second encrypted request to the particular URL.

Gateway 140 may receive content from server 162, as illustrated by 122. In particular embodiments, server 162 sends the data corresponding to the resource of the particular URL based on server 162 determining the user has access authorization. As an example and not by way of limitation, the access authorization from server 162 may be in response to server 162 identifying client device 130. For example, the MAC address of client device 130 may match a previously stored MAC address. At 124, gateway 140 may route the content corresponding to the resource of the particular URL to web browser 132. As an example and not by way of limitation, server 162 of a social-networking system may determine that the user associated with client device 130 had previously signed the TOS based on the MAC address of client device 130 matching a list of client devices of users that have signed the TOS. Server 162 may send content corresponding to a particular newsfeed to client device 130 once server 162 determined that the TOS had been signed by the user.

Figure 2:
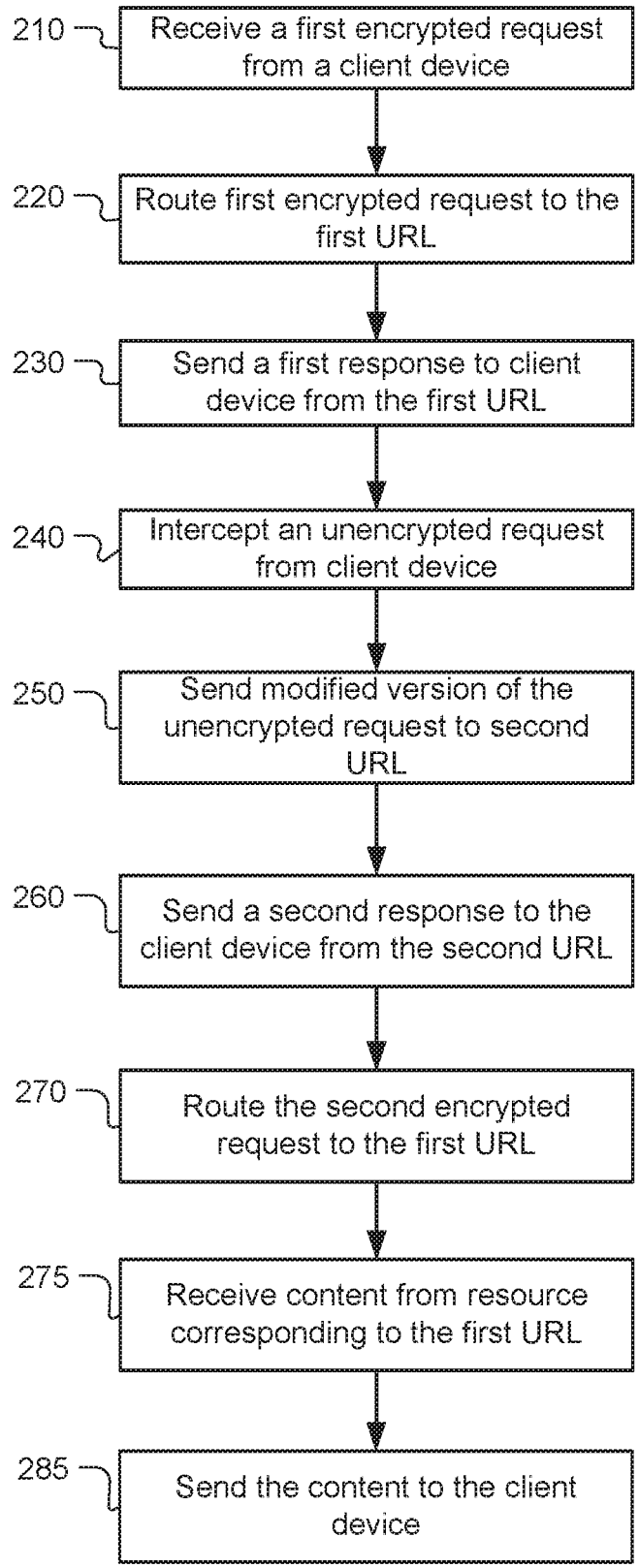
FIG. 2 illustrates an example method for accessing a resource.

FIG. 2 illustrates an example method 200 for accessing a resource. The method may begin at step 210, where a first encrypted request is received from a client device by a gateway. In particular embodiments, the request includes a request for access to a resource corresponding to a particular or first URL (e.g., a newsfeed or group of a social-networking system). At step 220, the first encrypted request is routed to the first URL, as described above in 104. At step 230, a first response is sent to the client device from the first URL by the gateway. As described above, the first response may include a redirection instruction to a second or secondary URL, and in particular embodiments, the secondary URL may be an unsecured URL (e.g., not using the secure socket layer (SSL) security protocol). At step 240, an unencrypted request from the client device is intercepted by the gateway. In particular embodiments, the unencrypted request includes a request to access a resource corresponding to the second URL. At step 250, a modified version of the unencrypted request is sent to the resource corresponding to the second URL. In particular embodiments, the modified version of the unencrypted request includes information identifying the client device. As described above, a process executed by the gateway may intercept the unencrypted request and generate a modified version of the unencrypted request that adds information identifying the client device to the header of the modified version of the unencrypted request.

At step 260, a second response is sent to the client device from the second URL. In particular embodiments, the second response includes a redirection instruction that directs the web browser of the client device to the first URL. At step 270, a second encrypted request is routed by the gateway to the first URL from client device 130 in response to receiving a response from the second URL. In particular embodiments, content from the resource corresponding to a first URL is received in response to the identifying information matching identifying information previously stored on the resource corresponding to the first URL, as illustrated at step 275. In particular embodiments, at step 285, the gateway sends the content to the client device.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for accessing a resource including the particular steps of the method of FIG. 2, this disclosure contemplates any suitable method for accessing a resource including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
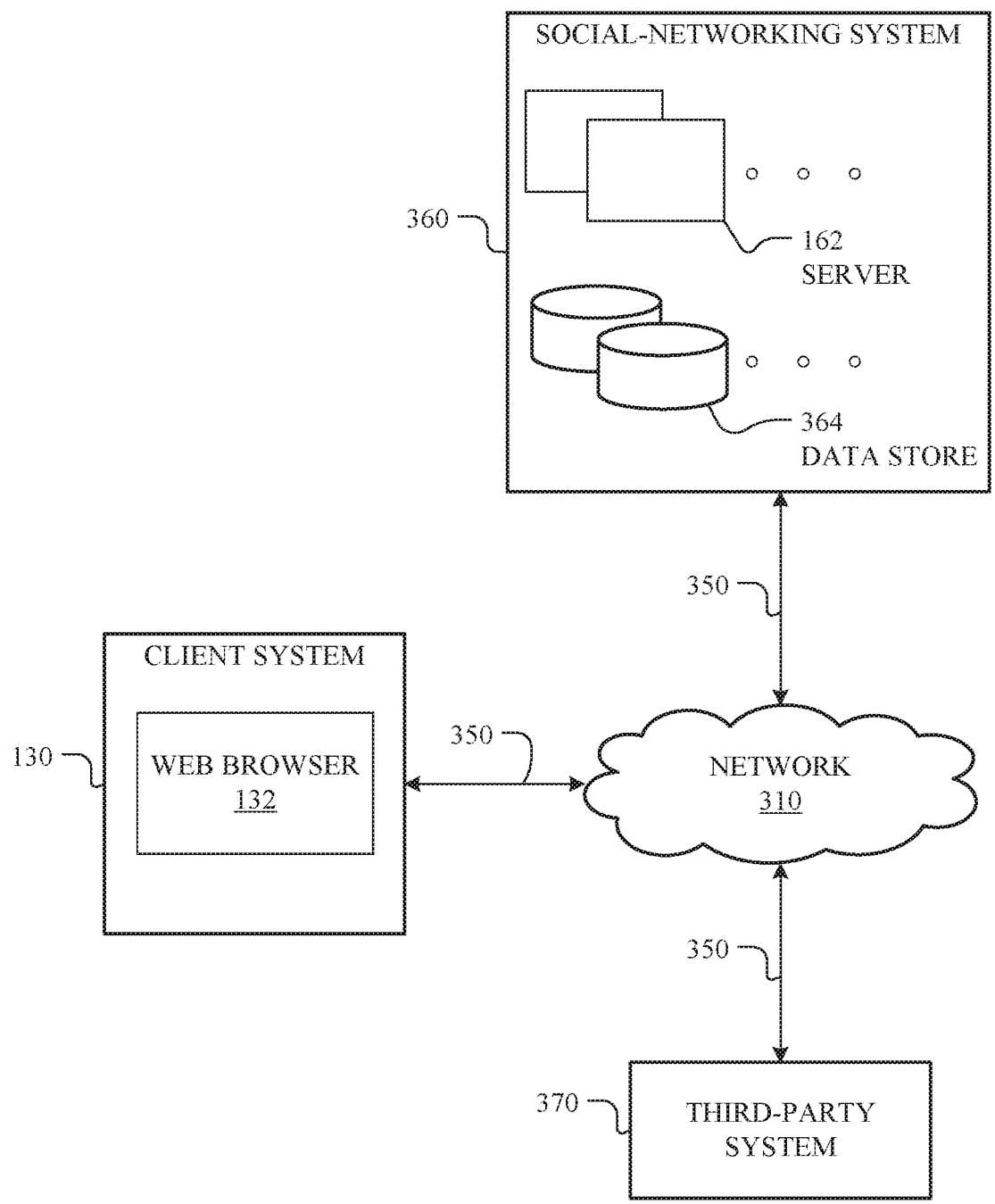
FIG. 3 illustrates an example network environment associated with a social-networking system.

FIG. 3 illustrates an example network environment 300 associated with a social-networking system. Network environment 300 includes a client system 130, a social-networking system 360, and a third-party system 370 connected to each other by a network 310. Although FIG. 3 illustrates a particular arrangement of client system 130, social-networking system 360, third-party system 370, and network 310, this disclosure contemplates any suitable arrangement of client system 130, social-networking system 360, third-party system 370, and network 310. As an example and not by way of limitation, two or more of client system 130, social-networking system 360, and third-party system 370 may be connected to each other directly, bypassing network 310. As another example, two or more of client system 130, social-networking system 360, and third-party system 370 may be physically or logically co-located with each other in whole or in part. Moreover, although FIG. 3 illustrates a particular number of client systems 130, social-networking systems 360, third-party systems 370, and networks 310, this disclosure contemplates any suitable number of client systems 130, social-networking systems 360, third-party systems 370, and networks 310. As an example and not by way of limitation, network environment 300 may include multiple client system 130, social-networking systems 360, third-party systems 370, and networks 310.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 130, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 310. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 370), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 360 may be a network-addressable computing system that can host an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. As an example and not by way of limitation, client system 130 may access social-networking system 360 using a web browser 132, or a native application associated with social-networking system 360 (e.g., a mobile social-networking application, a messaging application, another suitable application, or any combination thereof) either directly or via network 310. In particular embodiments, social-networking system 360 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 360 may include one or more data stores 364. Data stores 364 may be used to store various types of information. In particular embodiments, the information stored in data stores 364 may be organized according to specific data structures. In particular embodiments, each data store 364 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 360, or a third-party system 370 to manage, retrieve, modify, add, or delete, the information stored in data store 364.

In particular embodiments, social-networking system 360 may store one or more social graphs in one or more data stores 364. In particular embodiments, a social graph may include multiple nodes—which may include multiple user nodes (each corresponding to a particular user) or multiple concept nodes (each corresponding to a particular concept)—and multiple edges connecting the nodes. Social-networking system 360 may provide users of the online social network the ability to communicate and interact with other users. In particular embodiments, users may join the online social network via social-networking system 360 and then add connections (e.g., relationships) to a number of other users of social-networking system 360 to whom they want to be connected. Herein, the term "friend" may refer to any other user of social-networking system 360 with whom a user has formed a connection, association, or relationship via social-networking system 360.

In particular embodiments, social-networking system 360 may provide users with the ability to take actions on various types of items or objects, supported by social-networking system 360. As an example and not by way of limitation, the items and objects may include groups or social networks to which users of social-networking system 360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 360 or by an external system of third-party system 370, which is separate from social-networking system 360 and coupled to social-networking system 360 via a network 310.

In particular embodiments, social-networking system 360 may be capable of linking a variety of entities. As an example and not by way of limitation, social-networking system 360 may enable users to interact with each other as well as receive content from third-party systems 370 or other entities, or to allow users to interact with these entities through an application programming interfaces (API) or other communication channels.

In particular embodiments, a third-party system 370 may include one or more types of servers, one or more data stores, one or more interfaces, including but not limited to APIs, one or more web services, one or more content sources, one or more networks, or any other suitable components, e.g., that servers may communicate with. A third-party system 370 may be operated by a different entity from an entity operating social-networking system 360. In particular embodiments, however, social-networking system 360 and third-party systems 370 may operate in conjunction with each other to provide social-networking services to users of social-networking system 360 or third-party systems 370. In this sense, social-networking system 360 may provide a platform, or backbone, which other systems, such as third-party systems 370, may use to provide social-networking services and functionality to users across the Internet.

In particular embodiments, a third-party system 370 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 360 also includes user-generated content objects, which may enhance a user's interactions with social-networking system 360. User-generated content may include anything a user can add, upload, send, or "post" to social-networking system 360. As an example and not by way of limitation, a user communicates posts to social-networking system 360 from a client system 130. Posts may include data such as status updates or other textual data, location information, photos, videos, links, music or other similar data or media. Content may also be added to social-networking system 360 by a third-party through a "communication channel," such as a newsfeed or stream.

In particular embodiments, social-networking system 360 may include a variety of servers, sub-systems, programs, modules, logs, and data stores. In particular embodiments, social-networking system 360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 360 may also include suitable components such as network interfaces, security mechanisms, load balancers, failover servers, management-and-network-operations consoles, other suitable components, or any suitable combination thereof. In particular embodiments, social-networking system 360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 360 to one or more client systems 130 or one or more third-party system 370 via network 310. The web server may include a mail server or other messaging functionality for receiving and routing messages between social-networking system 360 and one or more client systems 130. An API-request server may allow a third-party system 370 to access information from social-networking system 360 by calling one or more APIs. An action logger may be used to receive communications from a web server about a user's actions on or off social-networking system 360. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 360. A privacy setting of a user determines how particular information associated with a user can be shared. The authorization server may allow users to opt in to or opt out of having their actions logged by social-networking system 360 or shared with other systems (e.g., third-party system 370), such as, for example, by setting appropriate privacy settings. Third-party-content-object stores may be used to store content objects received from third parties, such as a third-party system 370. Location stores may be used for storing location information received from client systems 130 associated with users. Advertisement-pricing modules may combine social information, the current time, location information, or other suitable information to provide relevant advertisements, in the form of notifications, to a user.

Figure 4:
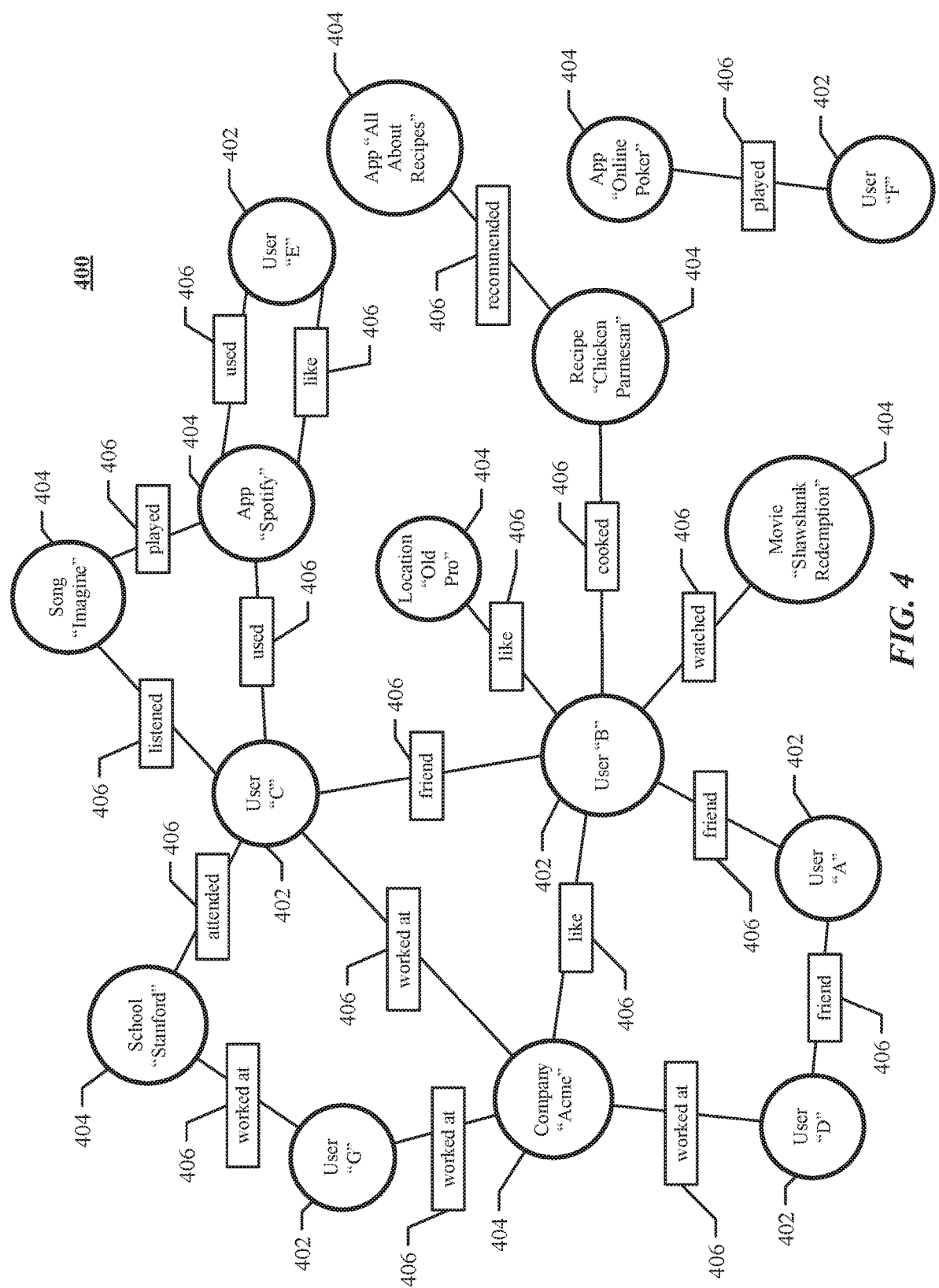
FIG. 4 illustrates an example social graph.

FIG. 4 illustrates example social graph 400. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 130, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party system 370. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 360 a message indicating the user's action. In response to the message, social-networking system 360 may create an edge (e.g., a check-in-type edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 360 may send a "friend request" to the second user. If the second user confirms the "friend request," social-networking system 360 may create an edge 406 connecting the first user's user node 402 to the second user's user node 402 in social graph 400 and store edge 406 as social-graph information in one or more of data stores 364. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to an edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 130) may indicate that he or she likes the concept represented by the concept node 404 by clicking or selecting a "Like" icon, which may cause the user's client system 130 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 360). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 360 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 360) or RSVP (e.g., through social-networking system 360) to an event associated with the advertisement. In addition or as an alternative, an advertisement may include social-networking-system content directed to the user. As an example and not by way of limitation, an advertisement may display information about a friend of the user within social-networking system 360 who has taken an action associated with the subject matter of the advertisement.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 404 corresponding to a particular photo may have a privacy setting specifying that the photo may only be accessed by users tagged in the photo and their friends. In particular embodiments, privacy settings may allow users to opt in or opt out of having their actions logged by social-networking system 360 or shared with other systems (e.g., third-party system 370). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 370, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 364, social-networking system 360 may send a request to the data store 364 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 364, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 5:
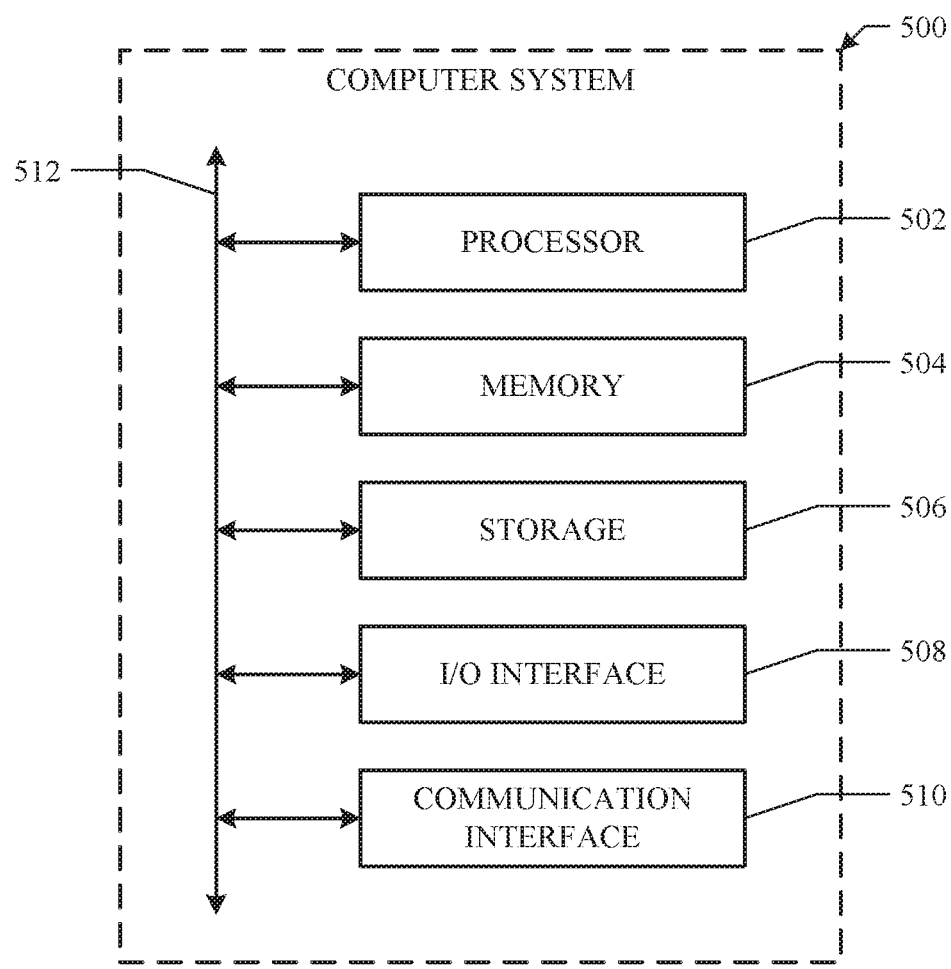
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, receiving a first encrypted request from a client device, wherein the request comprises a request for access to a resource corresponding to a first uniform resource locator (URL);
   by the computing device, routing the first encrypted request to the first URL;
   by the computing device, sending a first response to the client device from the first URL, wherein the first response comprises a redirection instruction to a second URL, and wherein the second URL is an unsecured URL;
   by the computing device, intercepting an unencrypted request from the client device, wherein the unencrypted request comprises a request to access a resource corresponding to the second URL;
   by the computing device, sending a modified version of the unencrypted request to the resource corresponding to the second URL, wherein the modified version of the unencrypted request comprises information identifying the client device;
   by the computing device, sending a second response comprising a redirection instruction to the first URL to the client device from the second URL, wherein the second response is received from the second URL in response to the resource corresponding to the second URL matching the information identifying the client device of the modified version of the unencrypted request to stored information identifying a plurality of previously authenticated client devices; and by the computing device, routing the second encrypted request to the first URL from the client device in response to receiving the second response.

2. The method of claim 1, further comprising:
receiving content from the resource corresponding to the first URL in response to the identifying information matching identifying information previously stored on the resource corresponding to the first URL; and
sending the content to the client device.

3. The method of claim 1, wherein sending the modified version of the unencrypted request further comprises:
parsing a header of the unencrypted request; and
modifying the header with the information identifying the client device.

4. The method of claim 3, further comprising digitally signing the modified version of the encrypted request.

5. The method of claim 1, wherein the information identifying the client device comprises a media access control (MAC) address, user identifier, telephone number, email address, or token.

6. The method of claim 1, wherein the redirection instruction to a second URL comprises a 302 redirect instruction.

7. The method of claim 1, wherein the first or the second URL is associated with a social-networking system.

8. The method of claim 1, wherein the computing device is associated with a social-networking system.

9. One or more computer-readable non-transitory storage media embodying software that is operable when executed to:
receive a first encrypted request from a client device, wherein the request comprises a request for access to a resource corresponding to a first uniform resource locator (URL);
route the first encrypted request to the first URL;
send a first response to the client device from the first URL, wherein the first response comprises a redirection instruction to a second URL, and wherein the second URL is an unsecured URL;
intercept an unencrypted request from the client device, wherein the unencrypted request comprises a request to access a resource corresponding to the second URL;
send a modified version of the unencrypted request to the resource corresponding to the second URL, wherein the modified version of the unencrypted request comprises information identifying the client device;
send a second response comprising a redirection instruction to the first URL to the client device from the second URL, wherein the second response is received from the second URL in response to the resource corresponding to the second URL matching the information identifying the client device of the modified version of the unencrypted request to stored information identifying a plurality of previously authenticated client devices; and
route the second encrypted request to the first URL from the client device in response to receiving the second response.

10. The media of claim 9, wherein the software is further operable to:
receive content from the resource corresponding to the first URL in response to the identifying information matching identifying information previously stored on the resource corresponding to the first URL; and
send the content to the client device.

11. The media of claim 9, wherein the software is further operable to:
parse a header of the unencrypted request; and
modify the header with the information identifying the client device.

12. The media of claim 11, wherein the software is further operable to digitally sign the modified version of the encrypted request.

13. The media of claim 9, wherein the information identifying the client device comprises a media access control (MAC) address, user identifier, telephone number, email address, or token.

14. The media of claim 9, wherein the redirection instruction to a second URL comprises a 302 redirect instruction.

15. The media of claim 9, wherein the first or the second URL is associated with a social-networking system.

16. The media of claim 9, wherein the computing device is associated with a social-networking system.

17. A system comprising:
one or more processors; and
a memory coupled to the processors comprising instructions executable by the processors, the processors being operable when executing the instructions to:
receive a first encrypted request from a client device, wherein the request comprises a request for access to a resource corresponding to a first uniform resource locator (URL);
route the first encrypted request to the first URL;
send a first response to the client device from the first URL, wherein the first response comprises a redirection instruction to a second URL, and wherein the second URL is an unsecured URL;
intercept an unencrypted request from the client device, wherein the unencrypted request comprises a request to access a resource corresponding to the second URL;
send a modified version of the unencrypted request to the resource corresponding to the second URL, wherein the modified version of the unencrypted request comprises information identifying the client device;
send a second response comprising a redirection instruction to the first URL to the client device from the second URL, wherein the second response is received from the second URL in response to the resource corresponding to the second URL matching the information identifying the client device of the modified version of the unencrypted request to stored information identifying a plurality of previously authenticated client devices; and
route the second encrypted request to the first URL from the client device in response to receiving the second response.

18. The system of claim 17, wherein the processors are further operable to:
receive content from the resource corresponding to the first URL in response to the identifying information matching identifying information previously stored on the resource corresponding to the first URL; and
send the content to the client device.

19. The system of claim 17, wherein the processors are further operable to:
parse a header of the unencrypted request; and
modify the header with the information identifying the client device.

20. The system of claim 17, wherein the processors are further operable to digitally sign the modified version of the encrypted request.

\* \* \* \* \*